United States Patent [19]

Murray

[11] 4,352,908

[45] Oct. 5, 1982

[54] BLENDS OF POLYSTRENE OR POLY (P-METHYLSTYRENE) AND P-METHYLSTYRENE-DIENE-STYRENE BLOCK COPOLYMERS

[75] Inventor: James G. Murray, East Brunswick, N.J.

[73] Assignee: Mobil Oil Corporation, New York, N.Y.

[21] Appl. No.: 335,779

[22] Filed: Dec. 30, 1981

[51] Int. Cl.³ .................... C08L 53/02; C08L 25/06
[52] U.S. Cl. .................................................. 525/98
[58] Field of Search ........................................ 525/98

[56] References Cited

U.S. PATENT DOCUMENTS

| 3,629,211 | 12/1971 | Nozaki | 525/241 |
| 3,784,587 | 1/1974 | Chambers | 525/98 |
| 4,275,179 | 6/1981 | Sherman | 525/98 |

*Primary Examiner*—Carman J. Seccuro
*Attorney, Agent, or Firm*—Charles A. Huggett; Michael G. Gilman; Edward J. Trojnar

[57] ABSTRACT

Blends of polystyrene, poly(p-methylstyrene) or copolymers of styrene and p-methylstyrene; and an A-B-A' p-methylstyrene-conjugated diene-styrene block copolymer containing, by weight of the block copolymer, about 5–40% p-methylstyrene, about 5–40% styrene, and about 20–80% conjugated diene, are disclosed.

9 Claims, No Drawings

BLENDS OF POLYSTRENE OR POLY (P-METHYLSTYRENE) AND P-METHYLSTYRENE-DIENE-STYRENE BLOCK COPOLYMERS

BACKGROUND OF THE INVENTION

1. Field of the Invention

This invention is directed to blends of p-methylstyrene-conjugated diene-styrene A-B-A' block copolymers and poly(p-methylstyrene) or polystyrene polymers.

2. Description of the Prior Art

Elastomeric A-B-A styrene-diene block copolymers have been known and blends thereof with poly(p-methylstyrene) are described in U.S. Pat. No. 4,275,179 which is incorporated herein by reference. Insofar as is now known, blends of polystyrene or poly(p-methylstyrene) and the A-B-A' block copolymers in accordance with this invention have not been proposed.

SUMMARY OF THE INVENTION

This invention is directed to blends of polystyrene or poly(p-methylstyrene) polymer and an A-B-A' p-methylstyrene-conjugated diene-styrene block copolymer containing, by weight of the block copolymer about 5–40% p-methylstyrene, about 5–40% styrene, and about 20–80% conjugated diene.

DETAILED DESCRIPTION OF THE INVENTION

An essential monomer used in preparing the A block of the A-B-A' block copolymers of this invention is p-methylstyrene. It is within the contemplation of this invention to use mixtures of methylstyrene rich in p-methylstyrene. Such mixtures contain at least 90 weight percent, preferably 95 weight percent, more preferably 97 or greater weight percent, p-methylstyrene and less than 0.1 weight percent o-methylstyrene with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 which is incorporated herein by reference.

The conjugated dienes to be employed in the formation of the polymer block B preferably have from 4–8 carbon atoms per molecule and still preferably from 4–5. Thus, the preferred species are butadiene and isoprene, although methylisoprene and other conjugated dienes may be utilized, as well as mixtures thereof. Hence, the preferred block copolymers are poly(p-methylstyrene)-polybutadiene-polystyrene and poly(p-methylstyrene-polyisoprene-polystyrene, as well as hydrogenated derivatives of these polymers.

The hydrogenated materials may be hydrogenated to any desired extent, although the substantially complete hydrogenation of at least the conjugated diene polymer block is desirable. In any event, if hydrogenation is resorted too, it is desired to reduce the original unsaturation of the block copolymer by at least about 50% and preferably by at least about 90%. The reasons for hydrogenation are broadly two-fold in that hydrogenation increases the stability of the product as well as raises the softening point thereof.

The ABA' block copolymer will contain between about 5 weight percent and about 40 percent poly(p-methylstyrene) and between about 5 weight percent and about 40 weight percent styrene, the balance being conjugated diene. The preparation of a typical ABA' block copolymer is illustrated by a p-methylstyreneisoprene-styrene block copolymer. The first polymer block comprising poly(p-methylstyrene) terminated with lithium is formed in a zone by introduction of p-methylstyrene, cyclohexane (as a suitable solvent), and secondary butyl lithium into the polymerization zone. After formation of the first polymer block, the second stage in the process wherein the elastomeric polymer block is formed is effected by introduction of isoprene into the reaction mixture, preferably together with further solvent, including a refluxing phase for temperature control. This results in the formation of an intermediate block copolymer comprising a first block of poly(p-methylstyrene) and a second block of polyisoprene terminated with lithium. In the third stage of the process, styrene is added to the reaction mixture and polymerization continued to form the three polymer block A-B-A', still terminated with lithium which is removed in the final stage of the process by the addition of a chain terminator, such as an alcohol or the like.

The initiators to be used in the process of preparing the block copolymers comprise alkyl lithium compounds which may be either primary, secondary or tertiry alkyls. These will have the general configuration:

wherein R is an alkyl radical and R' is hydrogen or alkyl. They include particularly normal butyl lithium, secondary butyl lithium, tertiary butyl lithium, secondary amyl lithium, tertiary amyl lithium, secondary hexyl lithium, tertiary hexyl lithium and other alkyl lithium compounds preferably having from 4 to 8 carbon atoms per molecule.

The proportion of initiator taking an active part in the block copolymerization will be varied between about 100 and about 2000 parts per million, based on the weight of the total monomers used.

Polymerization will be conducted at temperatures in the order of $-20°$ C. to about 100° C., preferably at temperatures between about 20° C. and 65° C., the temperature being controlled to yield the polymer product within a reasonable length of time at the initiator level being utilized.

The conditions of polymerization are adjusted so as to produce a first polymeric block having an average molecular weight between about 2,000 and 100,000. Having formed this first polymer block, the next stage in the process comprises addition of the second type of monomer, in this illustrative instance being a conjugated diene, such as one of those enumerated above. The proportion of monomer, assuming substantially complete polymerization thereof, will be sufficient to form a polymer block having an average molecular weight between about 25,000 and 1 million. Since, under the conditions of the process, the first polymer block is a "living polymer chain" terminated with a lithium radical, the block polymerization proceeds at the end of each of these living chains to form an intermediate two-block polymer having the structure A-B-

Li. After completion of the second polymer block, the terminal polymer block will be formed by introduction of the styrene. Again, this block copolymerizes with the living polymer chains and results under the conditions employed in the formation of a living three-block polymer having the general configuration A-B-A'-Li. The lithium is deactivated and the polymerization terminated by the injection at this point of a suitable chain terminator such as an alcohol, $H_2O$ or other known agents for this purpose.

Block copolymerization is preferably conducted in the presence of solvents. These must be chosen with some care for two principle aspects: If a borderline solvent system is utilized, in which the block copolymer at any stage in its preparation becomes somewhat insoluble, the danger exists that chain growth will be slow and non-uniform from monomer being rendered inaccessible to the growing chains at that point, resulting in broad molecular weight distributions both for the block in question and for the next block to form thereon. Precipitation of a polymer at any stage may be due either to insolubility of the particular species at that time in the solvent present but may be strongly affected by the temperature utilized for the polymerization procedure. Solvents may be selected for a secondary purpose, namely, the control of temperature during polymerization by reflux. Consequently, the temperature and solvent chosen for the process both have powerful effects on the ultimate properties of the polymerization product.

When the block copolymer being formed is one in which the two terminal blocks are poly(p-methylstyrene) and polystyrene blocks, it is preferable to employ a cyclic hydrocarbon, which may be either a cyloaliphatic, such as cyclohexane, or a member of the benzene series, such as benzene or toluene. The former type namely, cycloaliphatic hydrocarbon, is preferred since such materials are more easily purified. It is realized that mere traces of certain impurities suchas acetylenic impurities may have powerful deleterious effects upon the continuance of polymerization in the presence of the extremely small proportions of catalyst required.

Anionic polymerization is hindered by the presence of impurities that will react with the alkyl lithium initiators, such as acetylenic compounds, water, alcohols, and the like. In commercial scale operation, the reactants are purified by passing them through suitable absorption columns. In laboratory runs, however, purification is accomplished by titrating with butyllithium (BuLi) solution to a red end point, using phenanthroline indicator. As will be apparent, the strength of the BuLi solution is not a critical factor.

The preparation of poly(p-methylstyrene) polymers and random copolymers of styrene and p-methylstyrene is described in U.S. Pat. No. 4,306,049 which is incorporated herein by reference.

The weight ratio of the A-B-A' block copolymer and the other polymer, copolymer or mixtures thereof can be varied widely, generally within the ratio of 1:99 to 99:1 and more specifically in the range of 1:3 to 3:1.

Blending of the polymers is accomplished by procedures well known in the art including mixing solutions of the polymers in a suitable solvent, toluene for instance, and precipitating the blend; and mixing in a Brabender mixer, extruder or in a 2-roll differential speed mixer.

The blends of this invention exhibit, in general, high impact and stress crack resistance at minimum rubber levels and can be used to balance properties by blending with other compatible resins such as high impact polystyrene and high impact para-methyl styrene.

One particularly interesting potential use is in the preparation of blends of polystyrene and poly(p-methylstyrene). Poly(p-methylstyrene) and polystyrene and incompatible. Using the triblock polymers as a "bridge" or "linking agent", uniform mixtures or blends of poly(p-methylstyrene) and polystyrene can be formed. The poly(p-methylstyrene) block of the triblock polymer will be compatible with the poly(p-methylstyrene) and the polystyrene block will be compatible with the polystyrene, with the two portions of the admixture being linked by the elastomeric polybutadiene block.

The following examples demonstrate the preparation of the A-B-A' block copolymers and blends thereof in accordance with this invention.

EXAMPLE 1

Preparation of p-methylstyrene-diene-styrene block copolymers p-Methylstyrene (50 g., 97% para) was dissolved in 500 ml. of dry, air-free hexane and polymerized at 60° C., using 0.38 ml. of 2.6 M butyl lithium solution, until the reaction mixture no longer had any odor characteristic of p-methylstyrene. Butadiene (50 g.), which had been purified by treatment at $-80°$ C. with butyl lithium, was distilled into the solution containing the living poly(p-methylstyrene) anion. After stirring overnight at room temperature, the reaction mixture was warmed to 60° C. for two hours to complete the polymerization of the butadiene. Styrene (50 g.), which had been titrated with butyl lithium to a faint orange color, was then added and polymerized at 60° C. to complete the formation of the triblock polymer.

EXAMPLE 2

Preparation of a blend of A-B-A' block copolymers and poly(p-methylstyrene)

Toluene solutions of the A-B-A' block copolymer of Example 1 and of poly(p-methylstyrene) (1:1 weight ratio) were precipitated into methanol and dried. Transmission electron microscopy (40,000X) of a molded sample of the product (which was clear) in which the unsaturated diene portion of the block copolymer phase had been stained with osmium tetroxide showed a structure containing small domains of about 100 Angstroms in size which had agglomerated into larger "grope cluster" structures contained in a continuous matrix of poly(p-methylstyrene).

EXAMPLE 3

Preparation of a blend of A-B-A' block copolymer and polystyrene

In a manner similar to Example 2 a blend of the block copolymer of Example 1 with polystyrene was prepared. Again the sample was clear. The photograph by transmission electron microscopy (40,000 X) showed a continuous network of the block copolymer in a polystyrene matrix.

EXAMPLE 4

Preparation of blends of A-B-A' block copolymer, polystyrene and poly(p-methylstyrene)

Blends of the block copolymer of Example 1 (A-B-A') with boty polystyrene (PS) and poly(p-methylstyrene) (PPMS) were prepared in ratios A-B-A':PS:PPMS of 10:2:10 and 10:10:2. Molded samples of both were clear. The transmission electron photograph of the first sample (10:2:10) shows a block phase which appears to surround a large number of occlusions. In the second sample (10:10:2) there were a large number of agglomerated small domains with some area of continuous polystyrene phase present.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A blend comprising at least one polymer selected from the group consisting of poly(p-methylstyrene), polystyrene, and copolymers of styrene and p-methylstyrene; and an A-B-A' p-methylstyrene-conjugated diene-styrene block copolymer containing, by weight of the block copolymer, about 5–40% p-methylstyrene, about 5–40% styrene, and about 20–80% conjugated diene.

2. The blend of claim 1, wherein said conjugated diene is 1,3-butadiene.

3. The blend of claim 1, wherein said conjugated diene is isoprene.

4. The blend of claim 2 in which the block copolymer contains equal parts by weight of p-methylstyrene, 1,3-butadiene, and styrene.

5. The blend of claim 1 in which said polymer blended with the A-B-A' block copolymer is polystyrene.

6. The blend of claim 1 in which said polymer blended with the A-B-A' block copolymer is poly(p-methylstyrene).

7. The blend of claim 1 in which said polymer blended with the A-B-A' block copolymer is a mixture of polystyrene and poly(p-methylstyrene).

8. The blend of claims 1, 5, 6 or 7 in which said A-B-A' block copolymer comprises 1 to 99 weight percent of the composition.

9. The blend of claims 1, 5, 6 or 7 in which said A-B-A' block copolymer comprises 1 to 33 weight percent of the composition.

* * * * *